United States Patent

[11] 3,611,368

| [72] | Inventors | Joseph W. Crownover<br>6651 Avenida Mirola;<br>John I. Wilhelm, 5962 Avenida Chamnez,<br>both of, La Jolla, Calif. |
|---|---|---|
| [21] | Appl. No. | 818,870 |
| [22] | Filed | Apr. 24, 1969 |
| [45] | Patented | Oct. 5, 1971 |

[54] ELECTRONIC DISTANCE FINDER
8 Claims, 3 Drawing Figs.

[52] U.S. Cl. ................................................. 343/6 R,
343/7.5, 343/12
[51] Int. Cl. ................................................. G01s 9/38
[50] Field of Search ............................. 343/6.5, 6.5
LC, 7.5, 12, 6 A, 6

[56] References Cited
UNITED STATES PATENTS

| 2,779,018 | 1/1957 | Gregoire et al. | 343/12 |
| 2,837,736 | 6/1958 | Golay | 343/6 X |
| 2,921,302 | 1/1960 | Cartwright | 343/7.5 |
| 3,226,714 | 12/1965 | Appelgarth, Jr. | 343/6.8 |
| 3,438,032 | 4/1969 | Cook | 343/6.5 X |

*Primary Examiner*—Malcolm F. Hubler
*Attorney*—White & Haefliger

ABSTRACT: The disclosure concerns a ranging system based upon electromagnetic wave exchange between spaced stations to establish a closed loop circuit containing amplification stages, and wherein loop transmission of carrier and sideband frequencies is established with production of reverberations occurring at a rate which is a function of the distance between stations.

INVENTORS.
JOSEPH W. CROWNOVER
JOHN I. WILHELM
By White & Haefliger
ATTORNEYS.

Fig. 3.

ELECTRONIC DISTANCE FINDER

BACKGROUND OF THE INVENTION

This invention relates generally to ranging or distance finding, and more particularly concerns the use of reverberation frequency oscillation within a closed circuit established between spaced stations to determine distance between such stations.

Various electronic systems used in the past for ranging have included the echo principle (as for example radar), the radio wave phase-shift principle, and the optical laser beam transmissions. Such systems have certain disadvantages where low-cost ranging devices are called for; for example, radar and laser systems are expensive and complex, and phase-shift procedures introduce ambiguities and require numerous readings on steadily diminishing lengths of wave refinement.

SUMMARY OF THE INVENTION

It is a major object of the present invention to provide a simple, low-cost ranging system that will eliminate the disadvantages of prior systems, the invention being based upon the principle of electromagnetic wave exchange between stations to establish a closed loop circuit containing amplification stages, and wherein loop transmission of carrier and sideband frequencies is established with production of reverberations occurring at a rate which is a function of the distance between such stations. It then becomes possible to detect the reverberation rate to arrive at an accurate determination of such distance.

Basically, the invention is embodied in a combination or system that includes:

a. transmitting and receiving antennas $T_1$ and $R_1$ respectively at the first station, and transmitting and receiving antennas $T_2$ and $R_2$ respectively at the second station;

b. a source for an RF carrier signal $f_1$ delivered for transmission on $T_1$;

c. means at the second station to convert $f_1$ received on $R_2$ to an RF carrier signal $f_2$ delivered for transmission on $T_2$;

d. means at the first station to convert $f_2$ received on $R_2$ to a feedback RF carrier signal $f_1$ also delivered to $T_2$ and characterized in that loop or feedback transmission of carrier and sideband frequencies is established, with consequent production of reverberations occurring at a rate which is a function of the interstation distance; and e. means connected to the system to detect the thus established reverberation rate.

Accordingly, the system can be considered as an amplifier with an "active element" feedback channel (the $f_1$ and $f_2$ transmission loop) connected between the output and input sides of the amplifier such that the channel extends over a distance to be measured, the transmission of $f_1$ and $f_2$ over that channel being such that the source $f_1$ carrier is modulated to produce sidebands, reverberations occurring at a rate which is a function of the distance to be measured. Regarding the "active element" feedback loop, the converting means at the first station may typically include an oscillator generating a carrier frequency $f_3$ and a mixer connected to receive $f_3$ and $f_2$ and to produce the feedback $f_1$ delivered to $T_1$; also, the converting means at the second station may typically include an oscillator generating a carrier frequency $f_3$ and a mixer connected to receive $f_3$ and $f_2$ and to produce the $f_2$ delivered to $T_2$. Further, the detection means may typically include a demodulator connected between $R_1$ and the mixer at the first station to receive and demodulate the sideband frequency thereby producing a series of pulses (reverberations), and a pulse rate counter connected to the demodulator output, that rate being an inverse function of distance between the stations.

Another object of the invention is the provision of the same time delay for the primary source frequency $f_1$ and the heterodyning signal frequencies $f_3$, so as to produce constant phase relationship therebetween, for further accuracy. As will be seen, the source frequency $f_1$ and the signal frequency $f_3$, or submultiples thereof, may be separately or conjointly transmitted over auxiliary radio links between the two stations, before introduction to the loop after appropriate multiplication.

These and other objects and advantages of the invention, as well as the details of illustrative embodiments, will be more fully understood from the following description and drawings, in which:

DRAWING DESCRIPTION

FIG. 3 is a block diagram showing still another embodiment of the invention.

DESCRIPTION OF PREFERRED EMBODIMENTS

Figure 1:
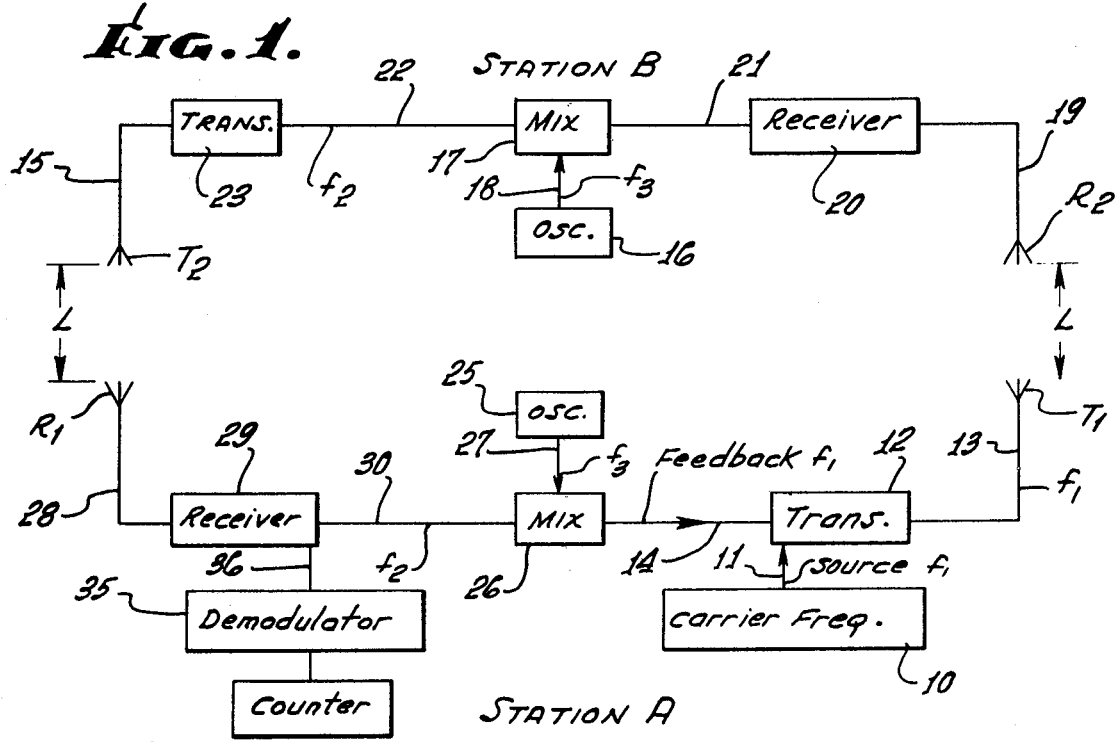
FIG. 1 is a block diagram illustrating one form of the invention.

Referring first to FIG. 1, a master station A and slave station B are separated by distance L, as indicated which is to be accurately determined. Transmitting and receiving antennas $T_1$ and $R_2$ are shown at station A, and transmitting and receiving antennas $T_2$ and $R_2$ are shown at station B. A source for an RF carrier signal $f_1$ is indicated at 10, it being electrically connected with $T_1$ as via line 11, transmission (power amplifications) stage 12 and line 13, for delivering source $f_1$ to $T_1$. Feedback $f_1$ is also delevered to stage 12, as via line 14.

Means is provided at the second station to convert $f_1$ received on $R_2$ to an RF carrier signal $f_2$ delivered at 15 for transmission on $T_2$. Such means may for example include crystal-controlled oscillator 16 generating a carrier radio frequency $f_3$, and a mixer stage 17 connected with the oscillator at 18 (to receive $f_3$) and with the antenna $R_2$ via line 19, receiver amplification stage 20 and line 21, to produce $f_2$ at 22. As an example, $f_2$ may be equal to $f_3-f_1$, and may then be passed to feeder line 15 via power amplification stage 23.

Similarly, means is provided at the first station to convert $f_2$ received on $R_1$ to the feedback RF carrier signal $f_1$ on line 14, as referred to, and characterized in that loop transmission of carrier and sideband frequencies is established, with production of reverberations occurring at a rate which is a function of the L distance. Such means may for example include crystal controlled oscillator 25 generating a carrier radio frequency $f_3$, and a mixer stage 26 connected with the oscillator at 27 (to receive $f_3$) and with the antenna $R_1$ via line 28, receiver amplification stage 29 and line 30, to produce feedback $f_1$ on line 14. As an example, $f_1$ may be equal to $f_3-f_2$.

Thus, the signal follows a closed circuit or loop, and if the amplification at the various stages referred to is sufficient, attenuation between stations will be overcome and feedback oscillation with reverberation will occur. The feedback oscillation will modulate the carriers, and sideband frequencies will be produced with values equal to the sum and difference of the carriers and feedback frequency. Assuming sideband frequency limits (away from the carrier) of 10 mc., a frequency variation of the feedback frequency from 0 to 10 mc. may be accommodated or, (source $f_1-10$ mc.) < feedback $f_1$ < (source $f_1+10$ mc.)

Since the feedback frequency will depend upon the transmit time of signal around the entire system, an examination of the time loss of the signal passage through the electronic equipment is justified. Assuming $f_1=150$ mc., the loss in elements 29, 26 and 12 will be on the order of 1/ 150 mc.=0.0066 ($10^16$ sec. Assuming $f_2=100$ mc., the loss in the elements 20, 17 and 23 will be on the order of 1/100 mc.=0.01 ($10^{16}$)sec., whereby total time delay for the electronic equipment around the loop will be about 0.016 ($10^{16}$). In these cases $f_3=250$ mc.

Transit time of the signal between stations may be examined assuming 1 mile separation, total travel distance then being 2 miles. Taking the speed of electromagnetic waves at 186,000 m.p.s., the transmit time will be about 2/186,000 or $10\times10^{16}$ seconds. An estimated accuracy in L measurement of one part in 125,000 thus becomes theoretically possible.

The invention also embraces the provision of means to detect the reverberation rate. As shown in FIG. 1, the detection means may include a demodulator 35 having input connection 36 between $R_1$ and mixer 26, (and typically to line 30) to receive a small portion of the modulated carrier $f_2$) with filtering and amplifications to detect the pulse rate of the generated sideband frequency, which pulse rate is an inversely proportional representation of the total distance L. In this regard, the following derivations are illustrative:

$$f = \frac{1}{D_E + \frac{2L}{C}}$$

where $f$ = frequency in cycles per second of reverberation and equal to $1/D_T$,
$D_T = D_E + D_D$ = delay time of entire system,
$D_E$ = delay time within electronic equipment,
$D_D$ = delay time of waves between stations, and equal to $L/C$
$L$ = distance between stations,
$C$ = velocity of electromagnetic waves.

Equation (1) may be rewritten as follows:

$$2L = \left(\frac{1}{f} - D_E\right)C. \quad (2)$$

Assuming a detected reverberation frequency of 49,955 representing an unknown distance, and assuming $D_E = 0.016 \times 10^{016}$ as referred to above, the distance $L$ may be determined from equation (2) by substituting values as follows:

$2L = (1/49,955 - 0.016 \times \times 10^16) 10^19$
$2L = (0.000020018016 - 0.000000016) 10^19$
$2L = 20,018.02 - 16 = 20,002.0$ feet
$L = 10,001.0$ feet Note also, the following table, using $D_E = 0.016 \times 10^{16}$.

TABLE I

| L (feet) | $D_D$ (seconds) | $D_D$ plus $D_E$ (seconds) | F (cycles) |
|---|---|---|---|
| 50,000 | .1000×10⁻² | 100.016×10⁻⁶ | 9998.4 |
| 25,000 | .0500×10⁻³ | 50.016×10⁻⁶ | 19,993.6 |
| 5,000 | .0100×10⁻³ | 10.016×10⁻⁶ | 99,840.25 |
| 500 | .0010×10⁻³ | 1.016×10⁻⁶ | 948,251 |
| 50 | .0001×10⁻³ | .116×10⁻⁶ | 8,620,690 |

Any distance $L$ less than about 50 feet will develop feedback frequency outside the ±10 mc. limit of the sideband frequency. To maintain an accuracy of approximately one part in 30,000, the upper limits of the equipment are about 3 miles. At a distance of 5 miles, accuracy will diminish to about one part in 10,000. Therefore, the practical $L$ range of the equipment may be considered to lie between the limits 50 feet and 5 miles.

Figure 2:
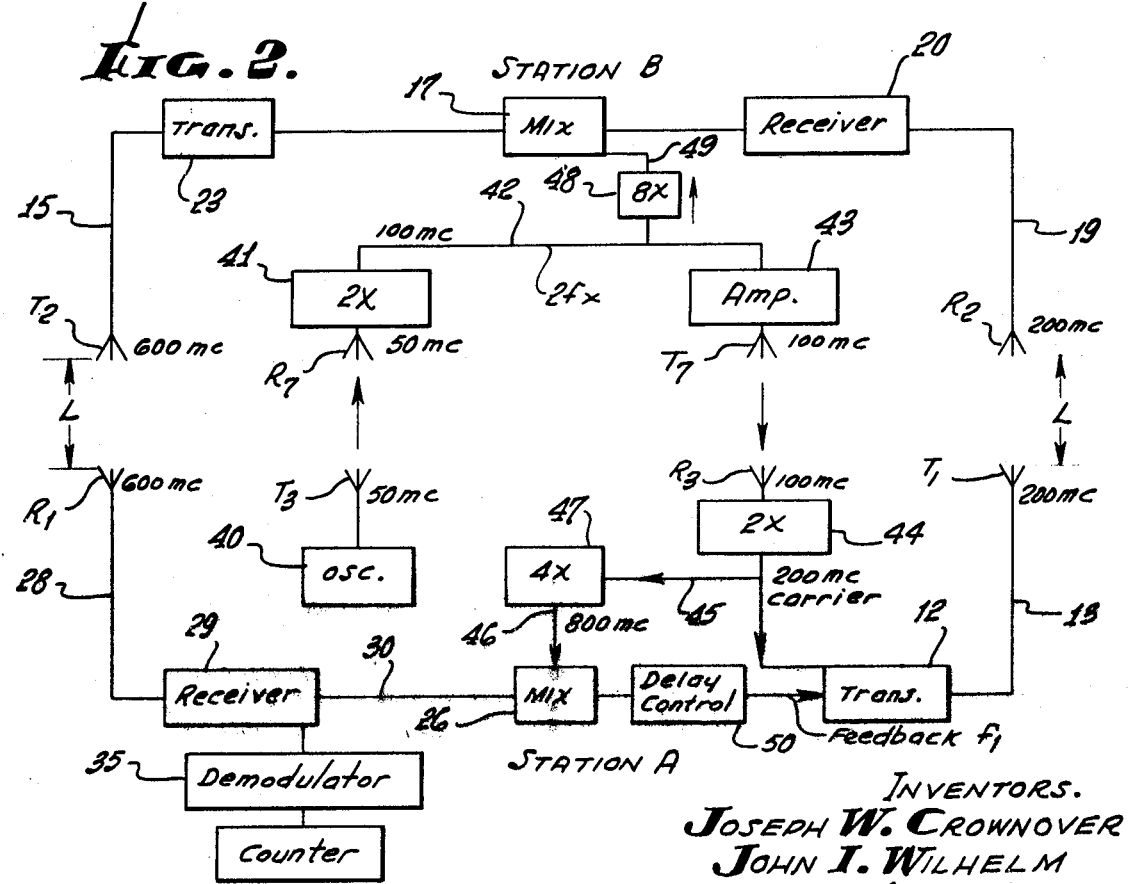
FIG. 2 is a block diagram illustrating another form of the invention.

Turning to FIG. 2, those elements remaining the same as in FIG. 1 bear the same numerals. Additional circuitry includes the oscillator 40 supplying the carrier frequency $f_x$ for transmission by antenna $T_3$ at station A and reception by antenna $R_7$ at station B. The received signals is multiplied twice at 41 and supplied on line 42 as $2f_x$. It is amplified at 43 and retransmitted by antenna $T_7$ for reception by antenna $R_3$ station A. From $R_3$ the signal $2f_x$ is multiplied twice at 44 and supplied as the source signal $f_1 = 4f_x$. A multiplied version $f_3$ of $f_1$ is supplied at 46 to the mixer 26 for conversion purposes, there being a multiplier 47 connecting lines 45 and 46 as shown. Thus, the phase delay relation between $f_3$ 3 and source $f_1$ remain the same. Similarly, line 42 is connected with mixer via multiplier 48 and line 49, maintaining constant phase relationship as between $f_3$ on line 49 and $f_1$ on line 45. Representative values are:

$f_x = 50$ mc.
$f_1 = 200$ mc.
$f_2 = 600$ mc.
$f_3 = 800$ mc.

A delay control 50 for feedback $f_1$ is connected between mixer 26 and amplifier stage 12.

Figure 3:
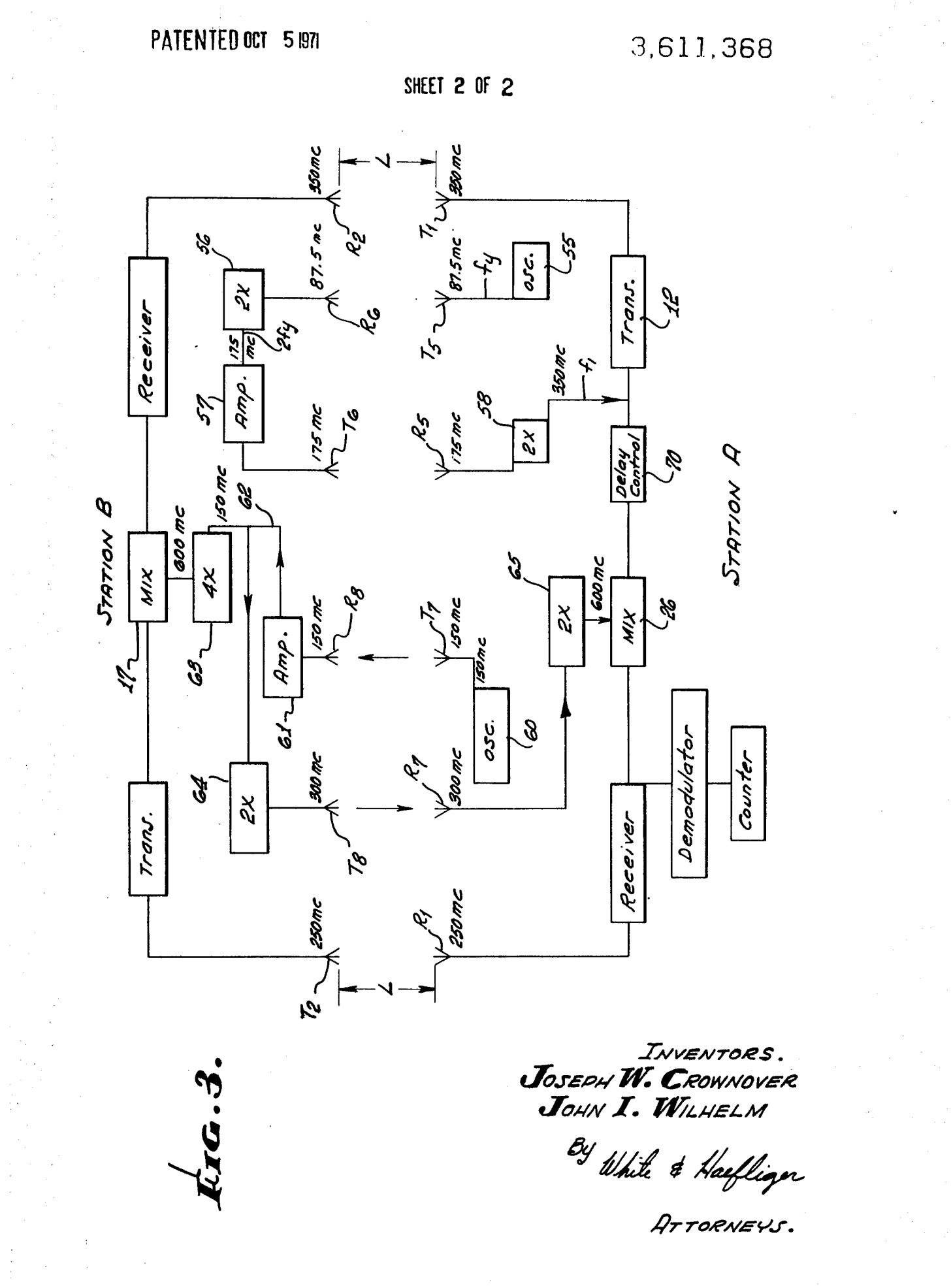

Turning to FIG. 3, the elements which are the same as in FIG. 1, again, bear the same numbers. Additional circuitry includes oscillator 55 supplying carrier frequency $f_y$ for transmission by antenna $T_5$ at station A and reception by antenna $R_6$ at station B. The received signal is multiplied twice at 56, amplified at 57, and retransmitted at $T_6$ for reception by antenna $R_5$ at station A. The signal is multiplied twice at 58 and supplied as $f_1 = 4f_y$ to the stage 12.

Another oscillator 60 supplies carrier signal $f_z$ for transmission by antenna $T_7$ and reception by antenna $R_8$ at station B. The received signal is amplified at 61 and delivered on line 62. Form the latter the signal is multiplied four times at 63 and supplied at $f_3$ to mixer 17. The $f_z$ signal on line 62 is also delivered to multiplier 64 the output $2f_z$ of which is delivered to antenna $T_8$ for transmission to antenna $R_7$ at station A. From the latter the signal is delivered to multiplier 65, the $4f_z$ output of which is supplied as $f_3$ input to mixer 26. Thus, the $f_3$ input to the mixers have a constant phase delay relation. Representative values are:

$f_y = 87.5$ mc.
$f_1 = 350$ mc.
$f_z = 250$ mc.
$f_3 = 600$ mc.
$f_z = 150$ mc.

A delay control 70 for feedback $f_1$ is connected between mixer 26 and amplifier stage 12.

We claim:

1. In apparatus for determining with accuracy the distance between first and second stations which are spaced apart, the combination comprising
   a. transmitting and receiving antennas $T_1$ and $R_1$ at the first station, and transmitting and receiving antennas $T_2$ and $R_2$ at the second station,
   b. a source for an RF carrier signal $f_1$ delivered for transmission on $T_1$,
   c. means to convert $f_1$ received on $R_2$ to an RF carrier signal $f_2$ delivered for transmission on $T_2$,
   d. means to convert $f_2$ received in $R_1$ to a feedback RF carrier signal $f_1$ also delivered to $T_1$ and characterized in that loop transmission of carrier and sideband frequencies is established with production of reverberations occurring at a rate which is a function of said distance, and
   e. means responsive to said last named means to detect said reverberation rate,
   f. said converting means including mixers, and said source including an oscillator and at least one radio link means with antenna structure coupling said source and mixers.

2. The combination of claim 1 wherein said detection means includes a demodulator having input connection between $R_1$ and the mixer at said first station to receive and demodulate the sideband frequency thereby producing a series of pulses, and a pulse rate counter connected to the demodulator output, the pulse rate being an inverse function of said distance.

3. The combination of claim 1 wherein said stations are separated by a distance of between 50 feet and 5 miles.

4. In apparatus for determining with accuracy the distance between first and second stations which are spaced apart, the combination comprising
   a. transmitting and receiving antennas $T_1$ and $R_1$ at the first station, and transmitting and receiving antennas $T_2$ and $R_2$ at the second station,
   b. a source for an RF carrier signal $f_1$ delivered for transmission on $T_1$,
   c. means to convert $f_1$ received on $R_2$ to an RF carrier signal $f_2$ delivered for transmission on $T_2$,
   d. means to convert $f_2$ received on $R_1$ to a feedback RF carrier signal $f_1$ also delivered to $T_1$ and characterized in that loop transmission of carrier and sideband frequencies is established with production of reverberations occuring at a rate which is a function of said distance, and
   e. means responsive to said last named means to detect said reverberation rate,
   f. said source for RF carrier $f_1$ comprising an oscillator at the first station, and means including transmit and receive antennas to transmit the oscillator frequency output to the second station and back to the first station and to frequency multiplication means at at least one of said stations to produce said source $f_1$.

5. In apparatus for determining with accuracy the distance between first and second stations which are spaced apart, the combination comprising a. transmitting and receiving antennas $T_1$ and $R_1$ at the first station, and transmitting and receiving antennas $T_2$ and $R_2$ at the second station, b. a source for an RF carrier signal $f_1$ delivered for transmission on $T_1$, c. means to convert $f_1$ received on $R_2$ to an RF carrier signal $f_2$ delivered for transmission on $T_2$, d. means to convert $f_2$ received on $R_1$ to a feedback RF carrier signal $f_1$ also delivered to $T_1$ and characterized in that loop transmission of carrier and sideband frequencies is established with production of reverberations occuring at a rate which is a function of said distance, and e. means responsive to said last-named means to detect said reverberation rate, f. said converting means (d) including an oscillator at one of said stations to generate a frequency which is a submultiple of a frequency $f_3$, a mixer connected to receive $f_3$ and $f_2$ and to produce said $f_1$ also delivered to $T_1$ and means coupling the oscillator output to the mixer to supply said $f_3$ and including at least one radio link means with antenna structure between said stations and frequency multiplier means connected in series with said antenna structure at at least one of the stations.

6. The combination of claim 5 wherein the oscillator is at the first station, there being one radio link coupling the oscillator output from the first station to the second station and another radio link coupling one frequency multiplied version of the oscillator output from the second station back to the first station, said one frequency multiplied version being generated by said frequency multiplier means.

7. The combination of claim 6 wherein said means $c$ to convert $f_1$ to $f_2$ is coupled at the second station to said one frequency multiplied version of the oscillator output.

8. The combination of claim 7 wherein said means to convert $f_2$ to feedback $f_1$ is coupled at the first station to another frequency multiplied version of the oscillator output derived from said one frequency multiplied version, said other frequency multiplied version being generated by said frequency multiplier means.